United States Patent [19]

Chauveteau et al.

[11] Patent Number: 5,368,101
[45] Date of Patent: Nov. 29, 1994

[54] METHOD FOR REDUCING RETENTION OF A DISPLACEMENT AGENT AND APPLICATION TO ASSISTED RECOVERY OF HYDROCARBONS

[75] Inventors: Guy Chauveteau; Jacqueline Lecourtier, both of Rueil Malmaison; Véronique Plazanet, Gif sur Yvette; Antide Putz, Pau, all of France

[73] Assignee: Institut Francais du Petrole, Rueil Malmaison, France

[21] Appl. No.: 39,413

[22] PCT Filed: Aug. 21, 1992

[86] PCT No.: PCT/FR92/00812
§ 371 Date: Jun. 2, 1993
§ 102(e) Date: Jun. 2, 1993

[87] PCT Pub. No.: WO93/04266
PCT Pub. Date: Mar. 4, 1993

[30] Foreign Application Priority Data

Aug. 22, 1991 [FR] France .................. 91 10591

[51] Int. Cl.$^5$ .............................. E21B 43/22
[52] U.S. Cl. ................... 166/273; 166/274; 166/275; 166/305.1
[58] Field of Search .......... 166/273, 274, 275, 305.1; 252/8.554

[56] References Cited

U.S. PATENT DOCUMENTS

| | | |
|---|---|---|
| 3,191,676 | 6/1965 | Froning . |
| 3,203,480 | 8/1965 | Froning . |
| 3,414,053 | 12/1968 | Treiber et al. ............ 166/273 |
| 3,437,141 | 4/1969 | Brandner et al. .......... 166/273 |
| 3,469,630 | 9/1969 | Hurd et al. ............ 166/273 X |
| 3,478,823 | 11/1969 | Murphy ................... 166/274 |
| 3,788,399 | 1/1974 | Feuerbacher et al. ...... 166/273 X |
| 3,827,499 | 8/1974 | Norton et al. ........... 166/305.1 |
| 3,977,470 | 8/1976 | Chang ................. 166/274 X |

*Primary Examiner*—George A. Suchfield
*Attorney, Agent, or Firm*—Antonelli, Terry, Stout & Kraus

[57] ABSTRACT

A method for reducing retention of a polymer based displacement agent injected into a hydrocarbon containing rock matrix involves treating the matrix with an adsorbent solution containing alkali metal phosphates after the rock matrix comprising clays has been stabilized by injection of a solution containing cations obtained from KCl or NaCL salts. The presence of the cations increases the effect of the adsorbent solution.

14 Claims, 2 Drawing Sheets

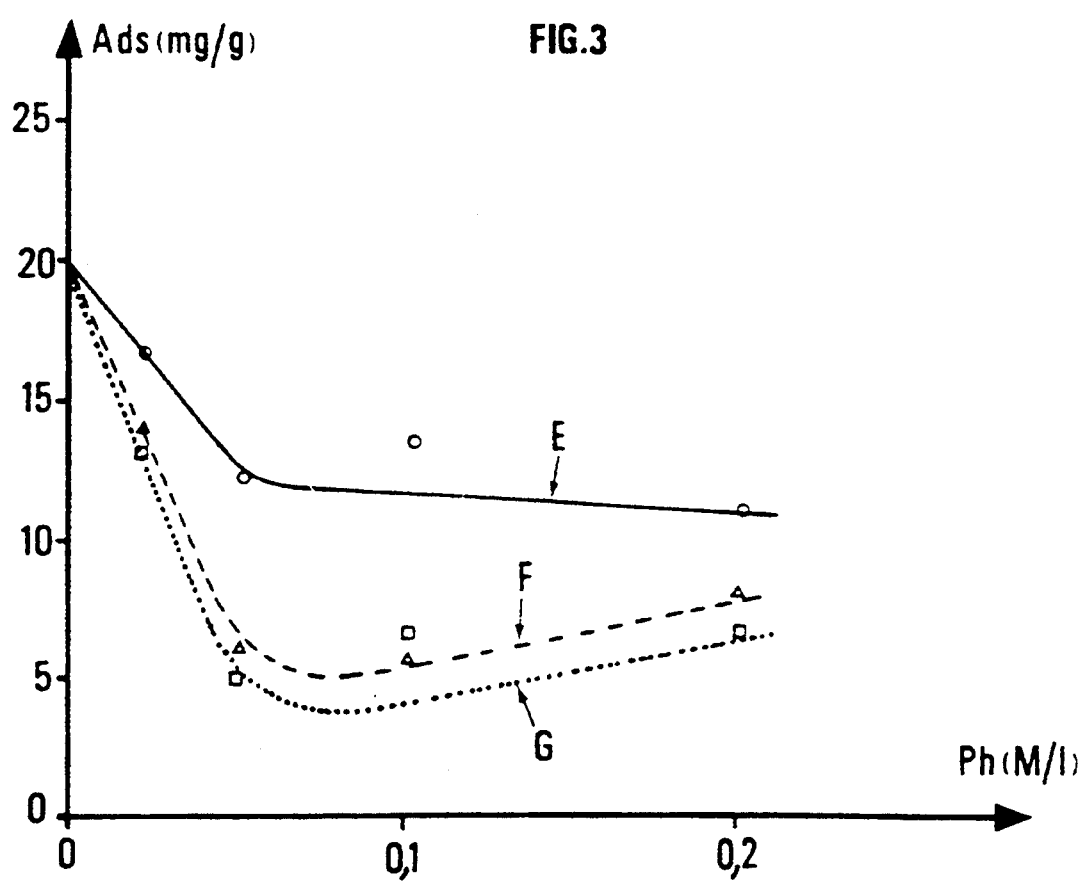

METHOD FOR REDUCING RETENTION OF A DISPLACEMENT AGENT AND APPLICATION TO ASSISTED RECOVERY OF HYDROCARBONS

FIELD OF INVENTION

The present invention relates to a method for reducing retention of a displacement agent used in secondary recovery. This method consists principally of treating the rock matrix in a special manner by injecting a solution including, in particular, phosphate or sulfite salts.

It also relates to application of this same method to improve a secondary hydrocarbon recovery operation that affords savings in particular in the quantity of displacement agent injected while controlling the stability of particles present in the rock matrix of the oil reservoirs concerned, which particles generally come from clay compounds.

BACKGROUND OF THE INVENTION

Primary recovery by natural drainage of liquid hydrocarbon deposits may be somewhat scanty, even in the presence of an active aquifer or a free-gas cap, so it is often necessary to use an assisted recovery method, for example by injecting a flushing fluid into the formation.

Water treated to be compatible with the reservoir rock, gases not miscible with hydrocarbons, gases miscible with hydrocarbons, microemulsions, or fluids based on polymers with high viscosity in situ may be injected.

All these processes, well known in the prior art, have the goal of flushing the reservoir rock containing the hydrocarbon as efficiently as possible. This flushing consists of driving the hydrocarbon toward the producing wells.

However, to different degrees depending on their sophistication, these processes all encounter the problem of economic feasibility. Because of the extra cost represented by the injection operations and the products injected, which are often not recoverable, profitability of such a deposit may be low or even zero. Thus it is crucial not to consume a large quantity of these expensive products.

If the displacement agent is polymer-based, the polymers are additives used principally as products that increase the viscosity of the basic fluid, namely water. They can also act on the water in the deposits.

These polymers have the property of adsorbing onto the rock matrix. This adsorption is manifested by retention of product on the rock matrix and hence decreases the polymer concentration in the displacement agent. Moreover, adsorption favors retention of the agent by a trapping phenomenon in the rock matrix. Thus the ratio between the mobility of the displacement agent and that of the hydrocarbon, which depends directly on the concentration, is favorable only in a small area around the injection zone. To remedy this major drawback, large concentrations of polymers may be injected, but this represents a high consumption of injected product and the cost of the operation becomes prohibitive.

U.S. Pat. No. 4,627,494 teaches a process for injecting a chemical into an oil reservoir to limit losses of surfactants used in secondary recovery. However this process relates only to products based on lignosulfonates.

U.S. Pat. No. 3,523,581 describes a process for injecting a first and then a second fluid before injecting the displacement fluid. The second fluid contains a product that can contain polyphosphates in particular, but these are intended only for pre-desorption of the first fluid in the reservoir rock. This method is particularly suitable for reservoirs with nonuniform permeability.

SUMMARY OF THE INVENTION

The present invention is directed to a method for reducing the retention of a displacement agent in a rock matrix of an underground reservoir containing a fluid, said agent being designed to displace said fluid, said rock matrix being stabilized by the presence of cations, and said reduction being effected by treating the rock matrix with an adsorbent solution.

In the present invention, this adsorbent solution contains phosphate or sulfite salts and the adsorption of said solution is increased by the presence of cations at a given concentration.

Said adsorbent solution may comprise sodium phosphate salts ($Na_2HPO_4$, $Na_3PO_4$), potassium phosphate salts ($K_2HPO_4$, $K_3PO_4$), or sodium or potassium sulfites.

The concentration in phosphate salts of said adsorbent solution may be between 0.004 mole/liter and 0.5 mole/liter, preferably between 0.01 and 0.1 mole/liter.

Said concentration determined in cations may be between 0.05 and 2 moles/liter.

The cations can be derived from monovalent sodium or potassium salt ions.

According to the method, the rock matrix can be treated, in the presence of cations, with the adsorbent solution before the displacement agent is injected.

However, the adsorbent solution and the displacement agent can also be injected together in the presence of the cations.

The displacement agent solution may include cations at a concentration that is approximately the same given concentration when it is injected separately from the adsorbent solution.

The solutions injected into the rock matrix may have a pH substantially between 4 and 10 and preferably between 7 and 10.

According to the method of the invention, in the presence of calcium ions in the rock matrix, a solution of cations at said given concentration may be injected before said adsorbent solution.

According to the method, said solution of a displacement agent may comprise high-molecular-weight partially hydrolyzed polyacrylamides or polyacrylamide copolymers or hydrolysates, high-molecular-weight xanthane or scleroglucane type polysaccharides, or any high-molecular-weight synthetic or natural water-soluble polymer with a weight greater than $10^6$ Daltons, for example.

The invention also relates to application of the above method to secondary recovery of hydrocarbons contained in a rock matrix of an underground reservoir traversed by at least one injection well and at least one producing well. In this application, said solutions are injected through said injection well and the hydrocarbons are produced by said producing well.

Said rock matrix may include clays.

The method of the invention may be advantageously applied when the water of formation contained in the pores of said rock matrix contains calcium ions.

A basic aspect of the invention is to optimize use of phosphate or sulfite solutions as treatment fluid for the reservoir rock in order to reduce retention of the displacement agent containing polymers. Retention is the loss of a certain quantity of displacement agent either by adsorption or by trapping. Trapping is favored when the agent is adsorbed. However, injection of such a solution into reservoir rocks containing in particular clay particles or non-clay particles causes these particles to destabilize.

The process of destabilization of porous media is as follows: the phosphate or sulfite ions are adsorbed at the surface of the minerals of the rock matrix, forming strong bonds with the surface hydroxyl groups (AlOH or SiOH). As a result of this adsorption, there is a substantial increase in the negative surface charge of the minerals, particularly the clays. This change in surface properties brings about an increase in repulsive forces of electrostatic origin either among the clay particles or between these particles and the quartz or carbonates which the reservoir matrix is composed. These repulsive forces decrease the cohesion of the rock and hence destabilize the porous medium.

This being the case, the reservoir runs a high risk of being clogged by agglomeration of these destabilized particles which are then displaced by entrainment by the flow of the injected displacement agent.

The invention describes the addition of cations, preferably of monovalent KCl or NaCl salts, at a given concentration, the presence of which prevents destabilization of clay or nonclay particles by the adsorbent solution as described above and at the same time increases the adsorption efficiency of the phosphates or sulfites on a rock matrix, whether the latter comprises clays, sands, or carbonates. Indeed, the phosphate or sulfite ions are negatively charged at, in particular, the surface of the sands or clays. When the salinity is increased by cations, preferably monovalent ions, the phosphate or sulfite ions can no longer easily approach the mineral surfaces because of the decrease in electrostatic repulsion. The phosphate or sulfite ions then form more bonds with these surfaces, namely they adsorb more and hence decrease to a greater extent the number of possible adsorption sites for the displacement agent.

As stated above, the preferred cations are monovalent ions but, still in the framework of this invention, other cations are possible such as ions of calcium or magnesium provided their concentration does not cause the phosphates or sulfites to precipitate.

Moreover it has been shown that the method of the present invention is independent of temperature, allowing for efficient utilization of this method whatever the depth of the hydrocarbon reservoir.

The solutions and fluids present in the method may have pH values varying between 4 and 10 but the pH should preferably be above 7.

According to the preferred method of the invention, the rock matrix is first treated with a volume of adsorbent solution as defined in the invention. The operation consists of injecting a volume of solution into the formation before the solution containing the displacement agent is injected. This procedure, known as "preflushing," requires the volume of treatment solution in relation to the pore volume of the rock matrix considered to be determined. This volume of treatment solution is generally at least equal to the volume of pores in which the displacement agent solution must play its role of drive fluid and flusher of hydrocarbons contained in this same volume.

Because of the treatment according to the invention, the solution containing the displacement agent essentially retains its characteristics and initial compositions as it flows through the reservoir rock. The rheology (particularly the viscosity) of the displacement agent is then easier to control, enabling maximum efficiency of hydrocarbon displacement by the displacement agent.

It will not be a departure from the present invention if, under certain conditions of the deposit and in order to simplify operations, the adsorbent agent and the displacement agent are injected at the same time. Of course this injection will always be in the presence of cations or monovalent ions at the concentration determined to prevent destabilization of the particles and enhance the action of the adsorbent solution.

When the water contained in the geologic formation contains large quantities of divalent ions such as calcium or magnesium, a cation solution at the given concentration can be injected to prevent precipitation of divalent phosphate or sulfite salts. The size of these quantities will be evaluated particularly by the relative proportion of these ions to the others in solution. The injection volume of this solution prior to the injection of phosphate solution and displacement fluid can in particular be between 0.2 and 1 pore volume. Monovalent ions from NaCl or KCl are preferred as cations.

BRIEF DESCRIPTION OF THE DRAWINGS

The present invention will be better understood and its advantages will appear more clearly from the following description of nonlimiting tests illustrated by the attached figures, wherein:

FIG. 3 shows the adsorption of a polymer as a function of phosphate concentration and monovalent ion concentration.

DETAILED DESCRIPTION OF THE INVENTION

Figure 1:
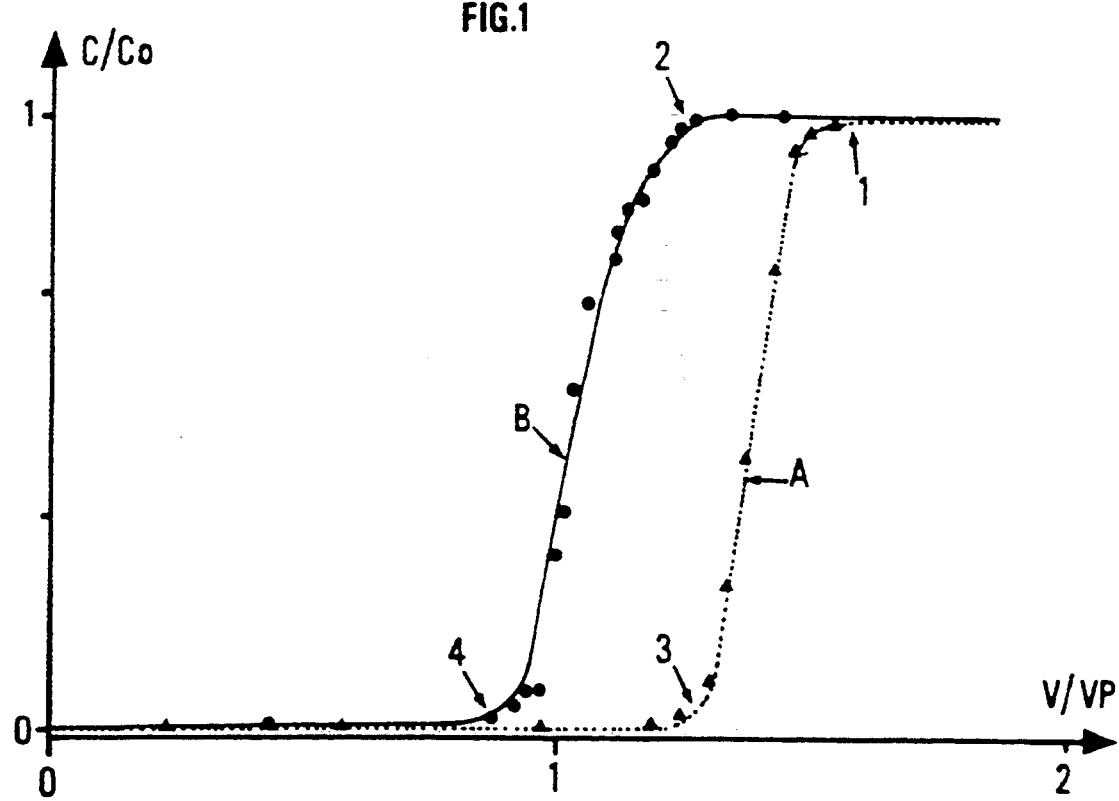
FIG. 1 contains curves 1 and 2 showing the polymer concentration of the displacement agent as it leaves the porous medium as a function of the volume injected, for two test conditions in a sample of clayey sand, FIG. 2 also shows two curves with the same parameters under different test conditions on a sample of clayey sandstone.
Figure 2:
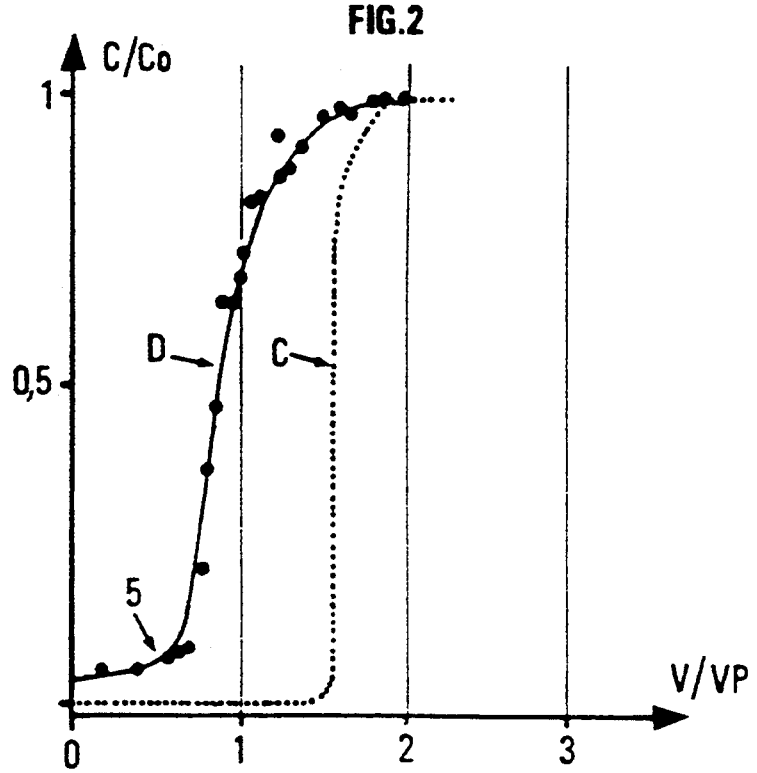

The principle of the following experiments and interpretation of the curves in FIGS. 1 and 2 is the following:

The samples are saturated with water. The volumes of injected solutions are driven into the water. The volumes injected and the polymer concentration of the solutions leaving the sample are measured. The appearance of the polymer front is interpreted as a function of the volume of solution injected. If it appears when a volume corresponding to one pore volume has been injected, there is no retention. If it is afterward, retention has occurred.

EXAMPLE 1

Three experiments were performed on a reservoir rock constituted by a slab of unconsolidated clayey sand. The permeability measured by the usual standards was 3.6 darcy.

The first experiment consisted of injecting into the slab a polyacrylamide solution at a concentration of 330 ppm. The injection rate was 0.35 m/d.

This solution was prepared in slightly saline water with the following composition:
sodium: 42 ppm
calcium: 40 ppm magnesium: 24 ppm
potassium: 11 ppm The pH was 7.

A volume of solution equal to three times the pore volume of the slab was introduced into the slab.

The curve of FIG. 1 gives the results in the form of a relative curve of polymer concentration C/Co on leaving the porous medium as a function of the volume injected, measured at the outlet from the porous medium. Co is the initial concentration of injected polymer. The polymer front appears at point 3, after measurement of the pore volume. This front is characteristic of substantial retention of polymer in the slab; the greater the delay in appearance relative to one pore volume, the greater the retention.

This phenomenon was confirmed and quantified by a materials balance between the inlet and outlet of the porous medium. This balance gives a retention of $90 \times 10^6$ g of polymer per gram of rock.

After this injection, the permeability of the porous slab was measured. This conventional measurement was done in water before the experiment then after the experiment. The ratio between these two measurements gives a reduction in permeability linked to retention of polymer on the order of 1.4.

This first experiment shows the relatively large loss of displacement product, particularly by adsorption onto the rock matrix.

The second experiment was performed under the same conditions as above but polymer injection was preceded by injection of an adsorbent solution of $Na_2HPO_4$ at a concentration of 0.008 mole/liter. The volume of this solution injected was equal to the pore volume. From the start of the injection of the polymer solution at the same rate of 0.35 m/d, gradual clogging of the porous medium was observed by measuring the change in charge losses through the medium. This clogging was caused by agglomeration of clays destabilized by the first injection of $Na_2HPO_4$. The polymer could not be injected because the slab shattered.

The third experiment was performed under the same conditions as before, but the phosphate ($Na_2HPO_4$) and polymer solutions were injected in a saline medium with 20 g/liter of NaCl. The phosphate and polyacrylamide concentrations remained identical as did the injection rate and pH.

The results are shown in curve B in FIG. 1. The polymer appears at 4, essentially at the measurement of one pore volume. This characterizes absence of adsorption in a porous medium.

The polymer concentration leaving the porous medium peaks at 2 while in the first experiment it peaked at 1. The area between the two curves A and B and delimited by points 1, 2, 3, and 4 represents the quantity of agent retained in the slab by comparison between the first and third experiments.

No clogging of the porous medium was found.

The polymer retention measured is very small, on the order to $10 \times 10^6$ g/gram.

The reduction in permeability after passage of the polymer is about 1.1.

This experiment shows that clays are no longer destabilized by injecting the phosphate solution, and were not displaced or agglomerated by injection of the displacement fluid, since the reduction in permeability is small.

This experiment also proves that polymer retention decreased by comparison to the first experiment. This confirms the effectiveness of the method according to the invention.

EXAMPLE 2

This experiment illustrates the method applied to a slab of clay sandstone comprising sand and approximately 5% illite. The measured permeability was 640 mD. The injections of phosphate and polymer solution both took place in an NaCl medium with a concentration of 20 g/l.

The phosphate solution, $Na_2HPO_4$, had a concentration of 0.01 mole/liter. The polyacrylamide solution had a concentration of 330 ppm.

A volume equal to 1.5 times the pore volume of phosphate solution was injected into the slab at a rate of 0.5 m/d.

The results plotted in curve D in FIG. 2 show practically total absence of polymer retention by comparison to the same phosphate-less injection represented by curve C in FIG. 2. As in the third experiment of the first example, arrival of the polymer front at 5 proves the absence of retention.

A reduction in permeability of less than 1.1 was measured after flushing with water.

Hence the method is applied with the same results in a rock with far lower permeability than that of Example 1.

EXAMPLE 3

This experiment demonstrates retention by adsorption of a polyacrylamide polymer partially hydrolyzed at the rate of 30% on a kaolinite. Adsorption was measured as a function of the salt (NaCl) concentration and as a function of the phosphate ($Na_2HPO_4$) concentration. The measurements were made on kaolinite particles, using the residue method. The polymer was tested by measuring the organic carbon in solution. The measurements were performed at a temperature of 30° C.

In the curves of FIG. 3, adsorption of the polymer is given in milligrams per gram on the ordinate and the phosphate concentration is given in moles per liter on the abscissa. Curve E is plotted for a concentration of 5 grams per liter of salt (NaCl). Curve F is plotted for a concentration of 20 grams per liter of NaCl. Curve G is plotted for a concentration of 50 grams per liter of NaCl.

It can be seen that, for all the phosphate concentrations chosen for the experiment, the efficiency of the adsorbent solution increases with the increase in sodium salt concentration.

A substantial reduction in polymer adsorption by the presence of phosphate can also be seen. In this experiment, the optimum phosphate concentration is essentially 0.08 mole per liter.

We claim:

1. A method for reducing the retention of a displacement agent on a rock matrix of an underground reservoir containing a fluid, said rock matrix comprising clays and said agent being capable of displacing said fluid, which comprises stabilizing said rock matrix by injection of a solution comprising cations obtained from KCl or NaCl salts and effecting the reduction of retention of the displacement agent by treating the rock matrix with an adsorbent solution of a phosphate salt selected from the group consisting of $Na_2HPO_4$, $Na_3PO_4$, $K_2HPO_4$ and $K_3PO_4$; the adsorption of said phosphate salt on the rock matrix being increased by the presence of said cations at a given concentration.

2. A method according to claim 1, wherein the phosphate salt concentration of said adsorbent solution is between 0.004 mole/liter and 0.5 mole/liter.

3. A method according to claim 1, wherein said given concentration of cations is between 0.5 and 2 moles/liter.

4. A method according to claim 1, wherein the rock matrix is treated by the adsorbent solution in the presence of said cations before injection of said displacement agent.

5. A method according to claim 1, wherein said adsorbent solution and said displacement agent are injected together into the rock matrix in the presence of said cations.

6. A method according to claim 1, wherein the displacement agent comprises an aqueous polymeric solution containing said cations at a concentration approximately the same as said given concentration.

7. A method according to claim 1, wherein the solutions of cations and of adsorbent injected into the rock matrix have a pH essentially between 4 and 10.

8. A method according to claim 1, wherein in the presence of calcium ions in the rock matrix, a solution of said cations at said given concentration is injected before said adsorbent solution is injected.

9. A method according to claim 1, wherein said displacement agent comprises an aqueous solution having high-molecular-weight partially hydrolyzed polyacrylamides or polyacrylamide copolymers or hydrolysates, high-molecular-weight polysaccharides of the xanthane or scleroglucane type, or any high-molecular-weight synthetic or natural water-soluble polymer with a molecular weight greater than $10^6$ Daltons.

10. Application of the method according to claim 1 to secondary recovery of hydrocarbons contained in a rock matrix of an underground reservoir traversed by at least one injection well and at least one producing well, wherein said solutions and said agent are injected through said injection well and the hydrocarbons are produced through said producing well.

11. Application according to claim 10, wherein water of formation contained in pores of said rock matrix comprises calcium ions.

12. A method according to claim 1, wherein the phosphate salt concentration of said adsorbent solution is between 0.01 and 0.1 mole/liter.

13. A method according to claim 1, wherein the solutions injected into the matrix rock have a pH essentially between 7 and 10.

14. A method according to claim 1, wherein the displacement agent comprises an aqueous solution of a high molecular weight water-soluble polymer.

* * * * *